United States Patent Office 3,830,755
Patented Aug. 20, 1974

3,830,755
SUPPORTED CATALYSTS CONTAINING VANADIUM PENTOXIDE AND ZIRCONIUM DIOXIDE
Peter Reuter, Bad Duerkheim, and Wilhelm Friedrichsen, Ludwigshafen, Germany, assignors to Badische Anilin- & Soda-Fabrik Aktiengesellschaft, Ludwigshafen (Rhine), Germany
No Drawing. Filed Nov. 29, 1972, Ser. No. 310,641
Claims priority, application Germany Dec. 1, 1971, P 21 59 441.2; Jan. 10, 1971, P 22 00 913.8
Int. Cl. B01j 11/06
U.S. Cl. 252—456                                       7 Claims

ABSTRACT OF THE DISCLOSURE

Supported catalysts for oxidation reactions consisting of an inert carrier and an active composition applied thereto in a thin layer which contains from 1 to 30% by weight of vanadium pentoxide, from 99 to 40% by weight of zirconium dioxide and from 0 to 59% by weight of titanium dioxide.

---

This invention relates to new supported catalysts containing vanadium pentoxide and zirconium dioxide and to the use of the new catalysts for the production of phthalic anhydride by oxidation of o-xylene or naphthalene with air.

French Pat. 1,480,078 discloses supported catalysts suitable for oxidation reactions which consist of an inert carrier which is coated with an active composition containing 15% by weight of $V_2O_5$ and from 85 to 99% by weight of $TiO_2$. In the production of phthalic anhydride by air oxidation of o-xylene or naphthalene these prior art catalysts give high yields and have proved to be suitable in the continuous production of phthalic anhydride on a commercial scale.

Since it is desirable to maintain these good results in prolonged continuous operation, catalysts have been sought which enable the reaction to be carried out under milder conditions so that their life may be prolonged.

We have now found a new supported catalyst which is particularly suitable for oxidation reactions and which consists of an inert carrier and an active composition containing vanadium pentoxide and zirconium dioxide applied thereto in a thin layer, wherein the active composition consists essentially of a mixture of from 1 to 30% by weight of vanadium pentoxide, from 99 to 40% by weight of zirconium dioxide and from 0 to 59% by weight of titanium dioxide and the vanadium pentoxide content of the supported catalyst is from 0.05 to 3% by weight.

The new and useful catalyst expediently contains as the inert carrier a nonporous inert material which has an internal surface area of, say, from 0 to 3 m.² per gram such as quartz, porcelain, fused aluminum oxide, silicon carbide, or fused or sintered silicates such as those of aluminum, magnesium, zinc or zirconium. The new catalyst may however also contain inert porous carriers such as pumice, silicates or aluminas. The carrier may be in the form of spheres, rings, tablets or pellets. The carrier preferably has a particle size of 4 to 12 mm. Spheres having a diameter of from 4 to 12 mm. are particularly advantageous.

The active composition is present on the carrier for example in an amount of from 2 to 15%, preferably 3 to 10%, by weight based on the carrier.

When the carrier is porous it is convenient for it to be primed by a conventional method with one or more oxides, for example of aluminum, molybdenum, chromium, tungsten, iron or cobalt, in an amount of about 0.1 to 5% by weight prior to being coated with the active composition.

The active composition consists essentially of a mixture of from 1 to 30%, preferably from 1 to 15%, by weight of vanadium pentoxide, from 99 to 40%, preferably from 99 to 50%, by weight of zirconium dioxide and from 0 to 59%, preferably from 0 to 49%, by weight of titanium dioxide. The zirconium dioxide in the composition advantageously has an internal surface area of from 2 to 25, particularly from 5 to 20, m.² per gram and a mean particle size of from 0.1 to 0.8, preferably from 0.2 to 0.5 microns. When the new catalyst contains titanium dioxide, this is advantageously present as anatase having an internal surface area of from 5 to 30, particularly from 5 to 20, m.² per gram.

It may be advantageous for the catalytic composition to contain a small amount, for example from 0.1 to 0.4% by weight, of phosphorus. In these cases an appropriate amount of a phosphorus compound such as phosphoric acid, ammonium dihydrogen phosphate or an ester of phosphoric acid is added during the preparation of the composition. The phosphorus is present as phosphorus pentoxide in the finished supported catalyst.

The active composition may also contain for example from 0.5 to 10% by weight of other oxides such as the oxides of aluminum, lithium, niobium, hafnium, tin, chromium, tungsten and molybdenum.

The production of the catalyst is carried out by a conventional method, for example by mixing a vanadium compound which is converted by heating into vanadium pentoxide such as ammonium vanadate or the oxalate, formate, acetate, tartrate or salicylate of vanadium in water or an organic solvent such as formamide, diethylacetamide, ammonium thiocyanate, molten urea or an alcohol, with finely divided zirconium dioxide and if desired together with the finely divided titanium dioxide and spraying the mixture (which usually has a semiliquid consistency) for example in a coating drum onto the carrier which has been preheated to from 150° to 450° C.

Instead of zirconuim dioxide and titanium dioxide it is possible to use in this method a compound of zirconium or titanium which is converted into zirconium dioxide or titanium dioxide.

For the production of suitable zirconium dioxide an aqueous, alcoholic or ethereal solution of a zirconium salt such as zirconium nitrate, zirconium chloride, zirconium oxychloride, zirconium oxalate or zirconium acetate is precipitated with ammonia, an alkali metal hydroxide or an alkali metal carbonate, conveniently at elevated temperature. The precipitated zirconium dioxide is then washed with water and heated, for example for from one hour to six hours at 700° to 1000° C.

For example a zirconium dioxide having an internal surface area of from 10 to 15 m.² per gram is obtained by heating at 800° C. for from two to four hours and a zirconium dioxide having an internal surface area of from 9 to 22 m.² per gram is obtained by heating at from 900° to 1000° C. Zirconium dioxide may also be prepared by calcining a zirconium salt of a volatile or thermally decomposable acid such as zirconium nitrate, zirconium oxychloride, zirconium carbonate, zirconium sulfate and zirconium chloride.

The zirconium dioxide is then ground extremely fine in order to achieve a mean particle size of from 0.1 to 0.8 micron, particularly from 0.2 to 0.5 micron. It has proved to be very suitable to use a colloid mill in which the oxide is ground for about three to twelve hours, conveniently in the presence of a liquid such as water or an organic solvent, for example methanol, with or without a wetting agent.

In the precipitation of the zirconium dioxide it is possible to mix the solutions of a zirconium compound and of a vanadium compound and to add to the mixture a precipitant for both components. It is possible in this way to incorporate up to 5% molar of vanadium pentoxide into the lattice of the zirconium dioxide crystal. For this purpose the procedure may be that vanadium pentoxide is dissolved in concentrated hydrochloric acid, converted by the addition of a low boiling point alcohol such as methanol into the tetravalent stage and this solution then mixed with a solution of zirconium oxychloride and both components precipitated with ammonia. The precipitate is exposed to a high temperature in order to achieve the intended internal surface area. The vanadium compound is thus converted into vanadium pentoxide.

The internal surface area of the zirconium dioxide is determined by the BET method (see J. Amer. Chem. Soc., vol. 60, 309 (1938) and German Laid-Open Specification No. 2,000,040).

When the catalysts of the invention are used for the production of phthalic anhydride, it is advisable to use a catalyst in which the zirconium dioxide has an internal surface area of at least 9 m.$^2$ per gram and advantageously from 9 to 22 m.$^2$ per gram when high throughputs of for example 4000 liters or more are used.

For the activation of the catalyst it may be advantageous to expose the supported catalyst after it has been coated to a temperature of from 400° to 550° C. for from half an hour to ten hours, and it may be convenient to carry out the heating in the presence of oxides of nitrogen, sulfur dioxide or hydrocarbons such as o-xylene.

The new catalysts are outstandingly suitable for oxidation reactions, particularly for the production of phthalic anhydride by oxidation of o-xylene or naphthalene with air. In the commercial production of phthalic anhydride the new catalysts are superior to the catalysts known from French Pat. 1,480,078 in that they are effective at a lower bath temperaure so that the life of the catalyst is lengthened. Moreover it is found that the catalysts of the invention surprisingly do not require any running-in period but give phthalic anhydride true to standard immediately after startup.

When the new catalysts are used for the production of phthalic anhydride they may be arranged in a conventional manner for example in a tubular reactor whose tubes have a diameter of from 25 to 40 mm. and contacted with the mixture of hydrocarbon and air. In the case of spehrical catalysts it is advisable to use catalysts of larger diameter in tubes of larger diameter. It is advantageous to use catalysts whose diameter is about one third of the diameter of the tubes.

In carrying out the oxidation the tubes are surrounded for the purpose of controlling the temperature with a bath of molten salt which has a temperature of from about 360° to 425° C. The hydrocarbon is passed through the tubes together with air which has advantageously been preheated to from 150° to 300° C., and the maximum temperature (or hot spot) which occurs in the first third of the bed of catalyst should not exceed 500° C. for a long period. The hourly loading of the catalyst in a tube having a diameter of 25 mm. and a length of 3 meters is generally from about 4000 to 8000 liters of air with about 40 g. of hydrocarbon per 1000 liters of air. The maximum internal temperature (hot spot) is controlled with the temperature of the salt bath. The salt bath temperature may be lowered by about 10° C. as compared with the use of prior art catalysts without the yield and purity of the product being impaired.

The following examples illustrate the invention.

EXAMPLE 1

1500 g. of steatite spheres having a diameter of 6 mm. are heated to 300° C. in a coating drum and sprayed with an aqueous suspension consisting of 135.2 g. of extremely finely ground zirconium dioxide having an internal surface area of 9.6 m.$^2$ per gram, 90.4 g. of ground anatase having an internal surface area of 11 m.$^2$ per gram, 32 g. of vanadyl oxalate (equivalent to 14.4 g. of $V_2O_5$), 100 g. of formamide and 340 g. of water. A supported catalyst is obtained having a content of 6% by weight of catalytic composition. The catalytic composition consists of 56.3% by weight of zirconium dioxide, 37.7% by weight of titanium dioxide and 6% by weight of vanadium pentoxide.

The catalyst is introduced into a tube having a diameter of 25 mm. and a length of 2 meters. 4000 liters of air and 160 g. of vaporized o-xylene having a purity of 98% are passed per hour through the bed of catalyst. The tube is surrounded by molten salt which has been heated to 380° C.

Pure phthalic anhydride is obtained in a yield of 104% by weight.

EXAMPLE 2

1500 g. of steatite spheres having a diameter of 6 mm. are heated to 300° C. in a coating drum and sprayed with an aqueous suspension consisting of 1177 g. of finely ground zirconium dioxide having an internal surface area of 9.6 m.$^2$ per gram, 48 g. of ground anatase having an internal surface area of 11 m.$^2$ per gram, 32 g. of vanadyl oxalate, 90 g. of formamide and 260 g. of water. A supported catalyst is obtained which has a content of 6% by weight of catalytic composition. The catalytic composition consists of 73.8% by weight of zirconium dioxide, 20.2% by weight of titanium dioxide and 6% by weight of vanadium pentoxide.

When o-xylene is reacted as described in Example 1 in the presence of this catalyst pure phthalic anhydride is obtained in a yield of 104% by weight.

EXAMPLE 3

The procedure described in Example 1 is adopted but the suspension applied to the heated carrier consists of 242 g. of finely ground zirconium dioxide having an internal surface area of 9.6 m.$^2$ per gram, 34.2 g. of vanadyl oxalate (equivalent to 13.4 g. of vanadium pentoxide), 120 g. of formamide and 220 g. of water. The supported catalyst has a content of 9% by weight of active composition. The catalytic composition consists of 94% by weight of zirconium dioxide and 6% by weight of vanadium pentoxide.

The yield of pure phthalic anhydride is 106% by weight.

EXAMPLE 4

1500 g. of steatite spheres having a diameter of 6 mm. are heated to 300° C. in a coating drum and sprayed with a suspension of 240 g. of zirconium dioxide, 34.2 g. of vanadyl oxalate (equivalent to 15.4 g. of $V_2O_5$), 120 g. of formamide and 220 g. of water. The zirconium dioxide has an internal surface area of 10 m.$^2$ per gram and has been ground for five hours in a colloid mill. The mean particle size is 0.4 micron.

A supported catalyst is obtained which has a content of 9% by weight of catalytic composition. The catalytic composition consists of 6% by weight of vanadium pentoxide and 94% by weight of zirconium dioxide.

The catalyst is introduced into a tube having a diameter of 25 mm. and a length of 3 meters.

4000 liters of air with 160 g. of vaporized o-xylene of 98% purity is passed per hour through the catalyst bed. The tube is surrounded by molten salt at a temperature of 370° C. A pure phthalic anhydride is obtained in a yield of 108% by weight.

We claim:

1. A supported catalyst for oxidation reactions comprising an inert carrier and, applied thereto, a thin layer of an active composition containing vanadium pentoxide and zirconium dioxide, said active composition consisting essentially of a mixture of from 1 to 30% by weight of vanadium pentoxide, from 99 to 40% by weight of zirconium dioxide and from 0 to 59% by weight of titanium dioxide wherein the zirconium dioxide has a mean particle size of from 0.1 to 0.8 micron with an internal surface area of from 2 to 25 m.² per gram and wherein the content of vanadium pentoxide in the supported catalyst is from 0.05 to 3% by weight.

2. A supported catalyst as claimed in claim 1 wherein the active composition consists essentially of a mixture of from 1 to 15% by weight of vanadium pentoxide, from 99 to 50% by weight of zirconium dioxide and from 0 to 49% by weight of titanium dioxide.

3. A supported catalyst as claimed in claim 1 wherein the zirconium dioxide has an internal surface area of from 5 to 20 m.² per gram.

4. A supported catalyst as claimed in claim 1 wherein the zirconium dioxide has a mean particle size of from 0.2 to 0.5 micron.

5. A supported catalyst as claimed in claim 1 wherein the titanium dioxide is present as anatase having an internal surface area of from 5 to 30 m.² per gram.

6. A supported catalyst as claimed in claim 1 wherein the inert carrier is a nonporous material having an internal surface area of 0 to 3 m.² per gram with a particle size of 4 to 12 mm.

7. A supported catalyst as claimed in claim 6 wherein the inert carrier consists essentially of steatite spheres with a diameter of 4 to 12 mm.

References Cited

UNITED STATES PATENTS

| | | | |
|---|---|---|---|
| 2,157,965 | 5/1939 | Pongratz | 252—461 |
| 3,306,915 | 2/1967 | Vrbaski | 252—461 |
| 3,507,813 | 4/1970 | Vrbaski | 252—461 |
| 3,565,829 | 2/1971 | Friedrichsen | 252—461 |
| 3,565,919 | 2/1971 | Friedrichsen | 252—461 |
| 3,704,317 | 11/1972 | Yamashita et al. | 252—461 |

DANIEL E. WYMAN, Primary Examiner

A. P. DEMERS, Assistant Examiner

U.S. Cl. R.X.

252—443, 455 R, 458, 459, 461, 464, 465, 466 J; 260—346.4

UNITED STATES PATENT OFFICE
CERTIFICATE OF CORRECTION

PATENT NO. : 3,830,755
DATED : August 30, 1974
INVENTOR(S) : Peter Reuter et al

It is certified that error appears in the above-identified patent and that said Letters Patent are hereby corrected as shown below:

In the Claims to Priority, delete "January 10, 1971" and substitute --January 10, 1972--

In Column 2, Line 39, delete "zirconuim" and substitute --zirconium--

In Column 3, Line 45, delete "spehrical" and substitute --spherical--

Signed and Sealed this

Twentieth Day of July 1976

[SEAL]

Attest:

RUTH C. MASON
*Attesting Officer*

C. MARSHALL DANN
*Commissioner of Patents and Trademarks*